United States Patent Office 3,312,687
Patented Apr. 4, 1967

3,312,687
(1-AZIRIDINYL)ALKYL ARYLTHIOCAR-
BAMATES
George E. Ham, Lake Jackson, Tex., assignor to The
Dow Chemical Company, Midland, Mich., a corporation of Delaware
No Drawing. Filed Oct. 14, 1963, Ser. No. 316,135
3 Claims. (Cl. 260—239)

This invention relates to new bactericidal compositions of matter and to a method for preparing such compositions. More particularly, the present invention relates to aryl thiocarbamates which contain a 3-membered nitrogen-containing ring in the molecule and to a method for preparing such compounds.

It is known that isothiocyanates combine with ethylenimine to form the corresponding substituted thioureas as disclosed by Gabriel et al. in Ber., 28, 2929. Similarly, propylene imine is known to react with phenyl isothiocyanate without cleavage of the aziridinyl ring. Moreover, it is known that alkanols react with phenylisothiocyanates. Prior to the present invention, however, it was unknown what effect the isocyanate group would have on the N-alkylaziridine group (or vice versa) under conditions necessary to obtain reaction of the relatively unreactive alcoholic OH with the isocyanate group.

It is an object of the present invention to provide a new class of organic compounds which are useful for the control of bacterial growth and which may be used in polymerized form for the production of laminated articles. A further object of the invention is to provide a process for the manufacture of such compounds.

The reaction used to prepare the compounds of the invention may be represented by the following equation

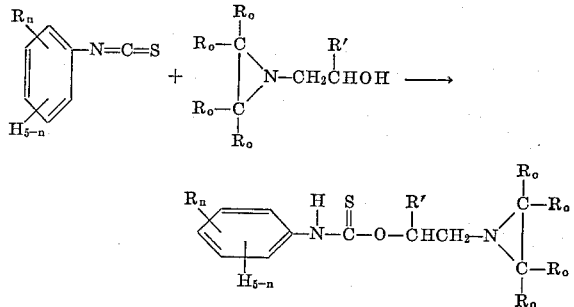

wherein $n$ is an integer from 0 to 3 which represents the number of R groups bonded to the aromatic nucleus, R is an alkyl group of from 1 to 2 carbon atoms (methyl or ethyl), R' is a hydogen atom or an R group (e.g., $(C_kH_{2k})H$ where $k$ is an integer from 0 to 2) and each $R_o$ is independently selected from the group consisting of the hydrogen atom and a lower alkyl group of from 1 to 4 carbon atoms, such as a methyl, ethyl, n-propyl, i-propyl, n-butyl, i-butyl, sec.-butyl or tert.-butyl group.

The reaction by which the compounds of the invention are prepared may be carried out at temperatures of from 50° to 150° C. and can be completed either with or without a suitable inert solvent (benzene, toluene, hexane, tetrahydrofuran, etc.). When a solvent is employed, it is desirable to use a solvent with a boiling range within the desired reaction temperature range. It is preferable to use stoichiometric amounts of reactants, but a slight excess of either reactant may be tolerated in the reaction. For example, mole ratios of aziridinyl alcohol to arylisothiocyanate of from about 0.5:1 to 1.5:1 may be used.

The starting aziridinyl alcohols are prepared by known methods, for example, by the reaction of aziridine or a substituted aziridine with an epoxyalkane (e.g., ethylene oxide, propylene oxide or butylene oxide).

The compounds of the invention (which contain both a chemically reactive heterocyclic ring and a sulfur atom) have been found to possess bactericidal activity. The compounds may be employed in dilute solutions or with an inert carrier (talc, diatomaceous earth) to control the growth of bacteria such as *Escherichia coli*. Furthermore, the compounds may be polymerized through the aziridinyl group to form polymers which may be used in the formation of laminated products (wood, paper, plastic) of increased strength by conventional laminating methods.

The following examples are submitted for the purpose of illustration only and are not to be construed as limiting the scope of the invention in any way.

EXAMPLE I

Into a reaction vessel equipped with a means for stirring, temperature control and refluxing was placed a solution of 4.35 grams of N-(2-hydroxyethyl)-aziridine dissolved in 50 milliliters of benzene and a second solution of 6.75 grams of phenylisothiocyanate dissolved in 50 milliliters of benzene. These two mixtures were stirred together and refluxed for 23 hours at 84° C. Upon completion of this reflux period, the benzene was removed under reduced pressure. A quantitative yield of yellow, syrupy product was isolated and the infrared spectrum was consistent with that expected for O-[2-(1-aziridinylthyl)]phenylthiocarbamate, i.e., N-phenyl-O-[2-(1-aziridinyl)ethyl]-thiourethane:

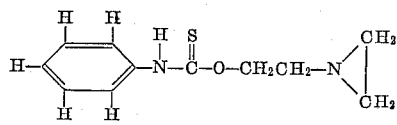

*Analysis.*—Percent N calculated for $C_{11}H_{14}N_2OS$: 12.62. Percent N found: 12.52.

Alkyl-substituted compounds such as N-(2-hydroxyethyl)-2-methylaziridine and N-(2-hydroxyethyl)-2,3-diethylaziridine react similarly with phenylisothiocyanate.

EXAMPLE II

A Petri dish containing nutrient agar was streaked with *E. coli*. The compound from Example I was cross-streaked into the agar-containing Petri dish and the agar was incubated for 72 hours at 25° C. No growth was observed at the intersection of the test compound and the *E. coli*. In all other inoculated areas, growth was abundant.

I claim as my invention:
1. A compound of the formula

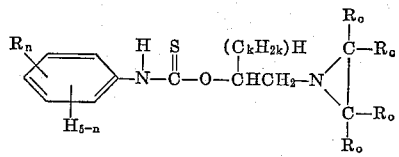

wherein:
(a) $n$ is an integer from 0 to 3 which represents the number of R groups which replace hydrogen atoms on the aromatic nucleus,
(b) R is an alkyl group of from 1 to 2 carbon atoms,
(c) $k$ is an integer from 0 to 2, and
(d) each $R_o$ is independently selected from the group consisting of the hydrogen atom and a lower alkyl group of from 1 to 4 carbon atoms.

2. A compound of the formula

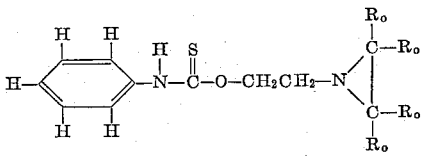

wherein each $R_o$ is independently selected from the group consisting of the hydrogen atom and a lower alkyl group of from 1 to 4 carbon atoms.

3. The compound:

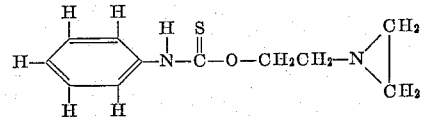

References Cited by the Examiner

Sidgwick, Organic Chemistry of Nitrogen (Oxford, 1937), pp. 332 and 337.

Staab et al., Ber. Deut. Chem., vol. 95, pages 1298–1306 (1962).

ALEX MAZEL, *Primary Examiner.*

ALTON D. ROLLINS, *Assistant Examiner.*